United States Patent
Nagira et al.

(10) Patent No.: US 6,400,959 B1
(45) Date of Patent: Jun. 4, 2002

(54) COMMUNICATION SYSTEM AND COMMUNICATION METHOD WITH DIVERSITY FEATURES

(75) Inventors: Tumoru Nagira; Kenzo Nakamura; Kenichiro Hosobuchi; Akira Shibuno, all of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/192,532

(22) Filed: Nov. 17, 1998

(30) Foreign Application Priority Data

Nov. 19, 1997 (JP) .............................. 9-318123

(51) Int. Cl.⁷ .............................. H04B 3/34; H04B 7/14
(52) U.S. Cl. ...................... 455/503; 455/509; 455/524; 455/101
(58) Field of Search ................................ 455/11.1, 436, 455/440, 443, 446, 450, 101, 13.1, 502, 503, 524, 59, 57, 60, 61, 63, 103, 7, 447; 370/279, 293, 310.2

(56) References Cited

U.S. PATENT DOCUMENTS

| | | | |
|---|---|---|---|
| 4,509,199 A | * | 4/1985 | Ichihara ........................... 455/7 |
| 4,539,706 A | * | 9/1985 | Mears et al. ............... 455/11.1 |
| 4,972,505 A | * | 11/1990 | Isberg ............................. 455/3 |
| 5,152,002 A | * | 9/1992 | Leslie et al. ................. 455/422 |
| 5,736,934 A | | 4/1998 | Nozawa et al. |
| 5,805,976 A | | 9/1998 | Frichtel et al. |
| 5,850,605 A | * | 12/1998 | Souissi et al. ............... 455/437 |
| 5,883,884 A | * | 3/1999 | Atkinson ..................... 370/279 |
| 5,983,072 A | * | 11/1999 | Schroderus ................. 455/11.1 |
| 6,088,592 A | * | 7/2000 | Doner et al. ................. 455/447 |

* cited by examiner

Primary Examiner—Edward F. Urban
Assistant Examiner—Temica M. Davis
(74) Attorney, Agent, or Firm—Oblon, Spivak, McClelland, Maier & Neustadt, P.C.

(57) ABSTRACT

A communication system and a communication method arranged to obtain a diversity effect in mobile communication, to reduce the influence of multipath interference, fading or the like, to perform comparatively simple information communication such as message communication with improved reliability, and to achieve effective utilization of frequencies. A plurality of base stations having receivers are provided around an urban area within base station zones. The base stations repeatedly transmit the same message data. Receiving repeaters are provided in the urban area and small or medium suburban zones. Each receiving repeater relays a signal from a small mobile terminal via an Internet network if the output level of the mobile terminal is so low that direct transmission to one of the base stations is impossible. A 25 kHz frequency band is divided into four narrower bands of 6.25 kHz in one of the embodiments. Of frequencies f1, f2, f3, and f4 in these bands, frequencies f1 to f3 are used for "down data transmission" from the base stations to a mobile terminal while f4 is used for "up data transmission" from the mobile station to one or more of the base stations.

16 Claims, 6 Drawing Sheets

BASE STATIONS AND CHANNEL SETTING

MOBILE TERMINALS AND CHANNEL FREQUENCIES

COMMUNICATION SYSTEM AND COMMUNICATION METHOD WITH DIVERSITY FEATURES

BACKGROUND OF THE INVENTION

1. Field of the Invention

The present invention relates to a communication system and a communication method which enable communication with a mobile terminal and, more particularly, to a communication system and a communication method which enable comparatively simple information communication, such as short-message communication, using a mobile communication system to be performed with improved reliability in an environment in which the influence of multipath interference, fading or the like upon communication is considerable. The present invention also relates to a communication system and communication method which enable effective use of frequencies for the above-mentioned kind of communications or the like.

2. Description of the Related Art

Various communication systems have been proposed for information communication with a mobile terminal. For example, communication systems described below may relate to the present invention.

A specialized mobile radio (SMR) communication system is a system enabling communication in a large-zone service area by placing a base station at the center of one area (zone) corresponding to the service area. This communication system, however, requires frequencies in a wide band for communication with many users in the large zone.

A cellular communication system has a service area zone divided into a group of a large number of small zones (cells), and has base stations respectively placed in the small zones to perform transmitting and receiving by using different frequencies respectively assigned to the zones. That is, to enable communication in a large-zone service area, a multiplicity of base stations is provided to cover the entire service area. In the cellular system, different frequency bands are used in cells comparatively close to each other, and frequencies in the same band can be used for cells which are located at such distances from each other that jamming therebetween can be ignored. Therefore, the overall frequency band for the cellular system can be smaller than that for the SMR system. However, since the frequency bands for cells which are located so close to each other that jamming can occur, as well as the frequency bands for adjacent cells, are set different from each other, the overall frequency band necessary for the cellular system is substantially wide, though not so wide as that for the SMR system.

Various mobile information communication systems presently used, including the SMR and cellular communication systems, require a disadvantageously wide frequency band, as described above. Available frequency bands are restricted, and there is a limit to use of frequencies in a wide band.

For example, with respect to communication using a simple message, use of frequencies by the SMR communication system or cellular communication system is uneconomical. In particular, the conventional communication systems are being used mainly for speech communication or telephone communication and subordinately for message data and other kinds of data.

In mobile communication, particularly in communication in an urban area, a problem of interference such as multipath cancellation and fading due to the existence of buildings is encountered. To cope with multipath cancellation or fading, trials have been made with a diversity system or the like. If such a system is used, a problem of a considerable increase in facility price arises. In particular, when communication with a mobile terminal is performed, the condition of interference such as multipath cancellation and fading changes continuously, and it is difficult to cope with such interference.

As determined by the present inventors there is a demand for an apparatus (facilities) of a lower price for communication using a particularly simple message data. However, including ways for coping with multipath cancellation and fading will likely increase the facility price. If the apparatus is made without such features due to price controls, the rate of bit error in received data is increased, resulting in a considerable reduction in communication accuracy or, in some case, occurrence of communication failure.

In a multichannel communication system, such as a cellular communication system, using a small-power output, outputs of a multichannel transmitter may be output by being collectively amplified by one wideband amplifier. In other general cases, however, a combiner for combining outputs is used and a duplexer filter or a similar circuit for separating a transmission frequency and reception frequency from each other is also used for the purpose of eliminating mutual interference between channels. However, if such signal processing is performed, a signal loss is caused and the antenna output is considerably reduced. If the power is increased to avoid such an undesirable effect, a need to increase the withstand voltage of electronic circuit components and to provide other various processing techniques arises, resulting in an increase in circuit complexity and an increase in the price of the apparatus.

On the other hand, trails have been made using Internet communication systems. Internet communication systems have been used by being annexed to systems using mobile terminals because of matching in terms of system configuration or because of the relationship with the telephone number system. Considering the efficiency of connection of communication systems, the present connection to Internet communication systems cannot be regarded as suitable.

SUMMARY OF THE INVENTION

An object of the present invention is to address the above-described and other problems and provide a communication system and a communication method which are simple in system configuration, but which enable reliable message communication.

Another object of the present invention is to provide a communication system and a communication method which enable uniform communication with a reduced bit error anywhere in urban zones crowded with buildings, suburban zones where buildings are scattered, and so on.

Still another object of the present invention is to provide a communication system in which ain Internet system is incorporated as a "wired" circuit, which can be formed of comparatively low-priced system components, i.e., existing communication and data processing systems and communication apparatus, and which can be easily operated.

A further object of the present invention is to provide a communication system and a communication method arranged to make effective use of frequency bands and to enable communication in a restricted frequency band.

To achieve these and other objects, according to one aspect of the present invention, there is provided a communication system having a first area where communication with a mobile terminal can be performed and a second area where communication with a mobile terminal on the periphery of the first area can be performed. This communication system has a plurality of base stations provided on the periphery of the first area, each of the base stations being capable of communication in the first area, the base stations being capable of communicating with each other in a wireless communication manner. Downlink (down) message data is transmitted on a frequency in a first narrow band from one of the base stations. Each of the other base stations receiving the message data sends out the message on the same frequency as the frequency on which the message data has been received. A mobile terminal which receives a signal transmitted from the originating and other base stations transmits uplink (up) message data to the base stations by using a frequency in a second narrow band different from the frequency for transmission of the down message data.

Transmission of down message data from the base station is performed in the first narrow band of, for example, 6.25 kHz. Each of the other base stations receives this down message data and sends out the received message data on the same frequency as that on which it has received the message data. In this manner, the same message data is sent out from the plurality of base stations, thereby enabling a mobile terminal to receive a receivable one of the transmitted data groups. Thus, a diversity effect is achieved due to the redundancy in transmission. As a result, the influence of multipath interference or fading can be reduced. The mobile terminal receiving the message data sends up message data to the base stations on a frequency in a band different from the first narrow band. As described above, frequencies in different bands are used for transmission of down message data and transmission of up message data. For this communication system, no complicated communication protocols are used.

Preferably, at least one of the plurality of base stations is wire-connected to a wire communication network, and a receiving and repeating mechanism is provided which is wire-connected to the wire communication network, and which receives, in the communication possible area, a signal transmitted from a mobile terminal, and relays the signal via the wire communication network to the base station connected to the wire communication network. When the receiving and repeating means receives data transmitted from the mobile terminal, it sends the received data to the base station via the wire communication network in a wire communication manner.

The receiving and repeating mechanism receives message data transmitted from a mobile terminal when the output level of the mobile terminal is low, when the communication condition is not good, or when up message data cannot be directly transmitted to any of the base stations. The receiving and repeating means sends the data in a wire communication manner via the wire communication network, e.g., an Internet network to the base station connected to the Internet network. As a result, communication can be performed without being affected by multipath interference or fading regardless of the location of the mobile terminal.

More preferably, the originating base station that received the above-mentioned down message monitors the state of transmission of the message between the base stations and transmits a next message data on a frequency in a third narrow band different from the frequencies in the first and second narrow bands. Each of the other base stations receiving the next message data sends out the received message data on the same frequency as the frequency on which the message data has been resolved. A mobile terminal receiving a signal transmitted from the originating and other base stations transmits up message data to the base stations by using a frequency in the second narrow band different from the frequencies for transmission of the above-mentioned down messages.

The next down message data transmission is performed by using a frequency different from the frequency for the preceding down message transmission. Thus, message data transmission is performed at different times by using different frequencies, so that no jamming occurs. Although two narrow frequency bands are used, the width of each frequency band is narrow and the overall band width is limited.

More preferably, a subscriber's terminal is wire-connected to the wire communication network, and message data from the subscriber's terminal is transmitted as a down message via the wire communication network from the base station connected to the wire communication network.

In this manner, message data can be transmitted from a subscriber's terminal.

Specifically, the above-mentioned narrow frequency bands have a width of 6.25 kHz.

Also, specifically, the above-described wire communication network includes an Internet communication network.

According to another aspect of the present invention, there is provided a communication method using a first area where communication with a mobile terminal can be performed, a second area where communication with a mobile terminal on the periphery of the first area can be performed, and a plurality of base stations provided on the periphery of the first area, each of the base stations being capable of communication in the worst area, the base stations being capable of communicating with each other in a wireless communication manner. This communication method includes the steps of transmitting down message data on a frequency in a first narrow band from one of the base stations, sending out, from each of the other base stations receiving the message data, the received message data on the same frequency as the frequency on which the message data has been received, and transmitting, from a mobile terminal receiving a signal transmitted from the originating and other base stations, up message data to the base stations by using a frequency in a second narrow band different from the frequency for the transmission of the down message.

Preferably, at least one of the plurality of base stations is wire-connected to a wire communication network. When communication is performed by providing a receiving and repeating mechanism wire-connected to the wire communication network and capable of receiving in the communication possible area a signal transmitted from a mobile terminal and relaying the signal via the wire communication network to the base station connected to the wire communication network, the receiving and repeating mechanism receiving data transmitted from the mobile terminal sends the received data to the base station via the wire communication network in a wire communication manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Still another object of the present invention is to provide a communication system in which ain Internet system is incorporated as a "wired" circuit, which can be formed of comparatively low-priced system components, i.e., existing communication and data processing systems and communication apparatus, and which can be easily operated.

DESCRIPTION OF THE PREFERRED EMBODIMENT

Figure 1:
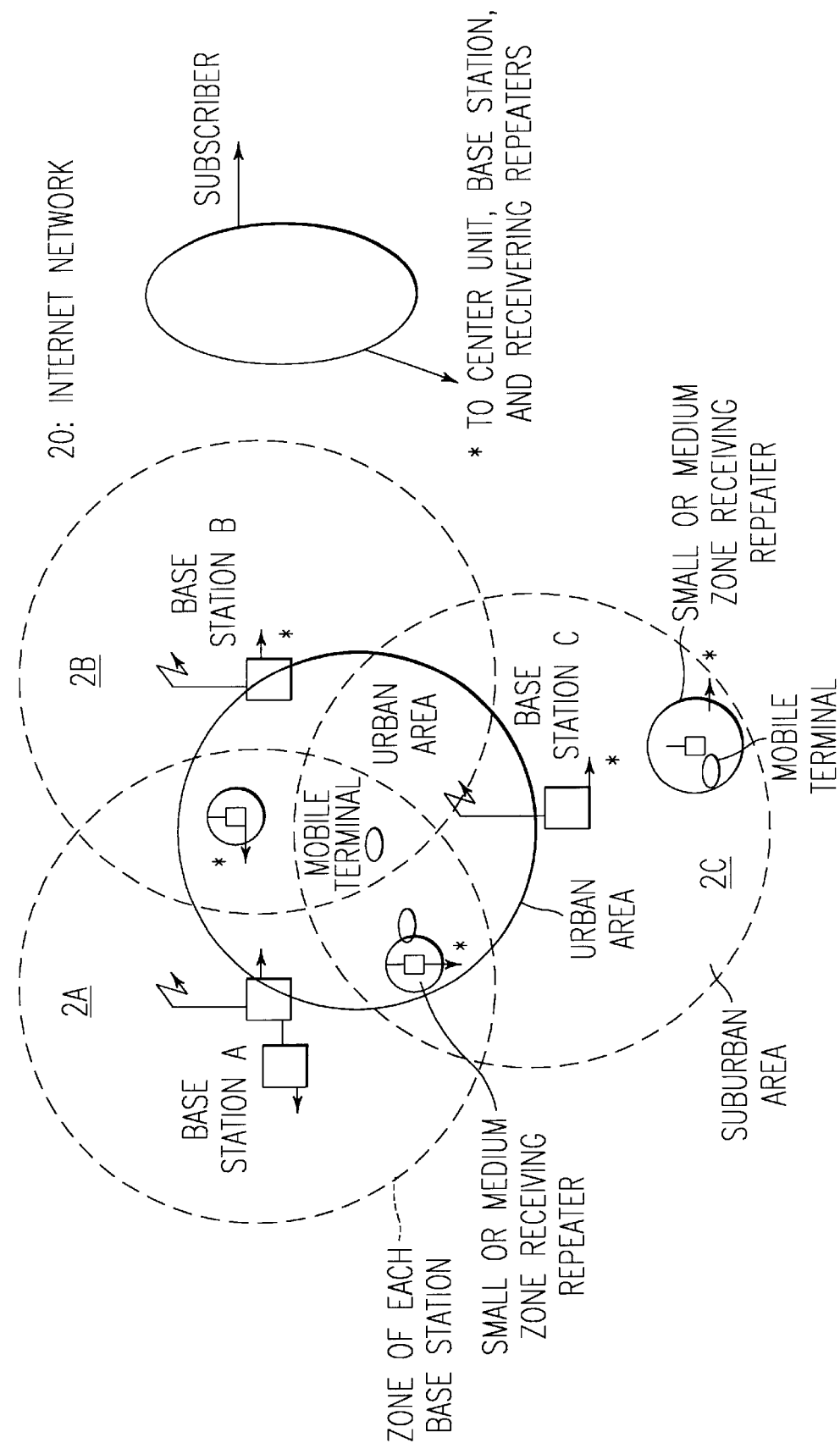
FIG. 1 is a block diagram or a communication system in accordance with the present invention.
Figure 2:
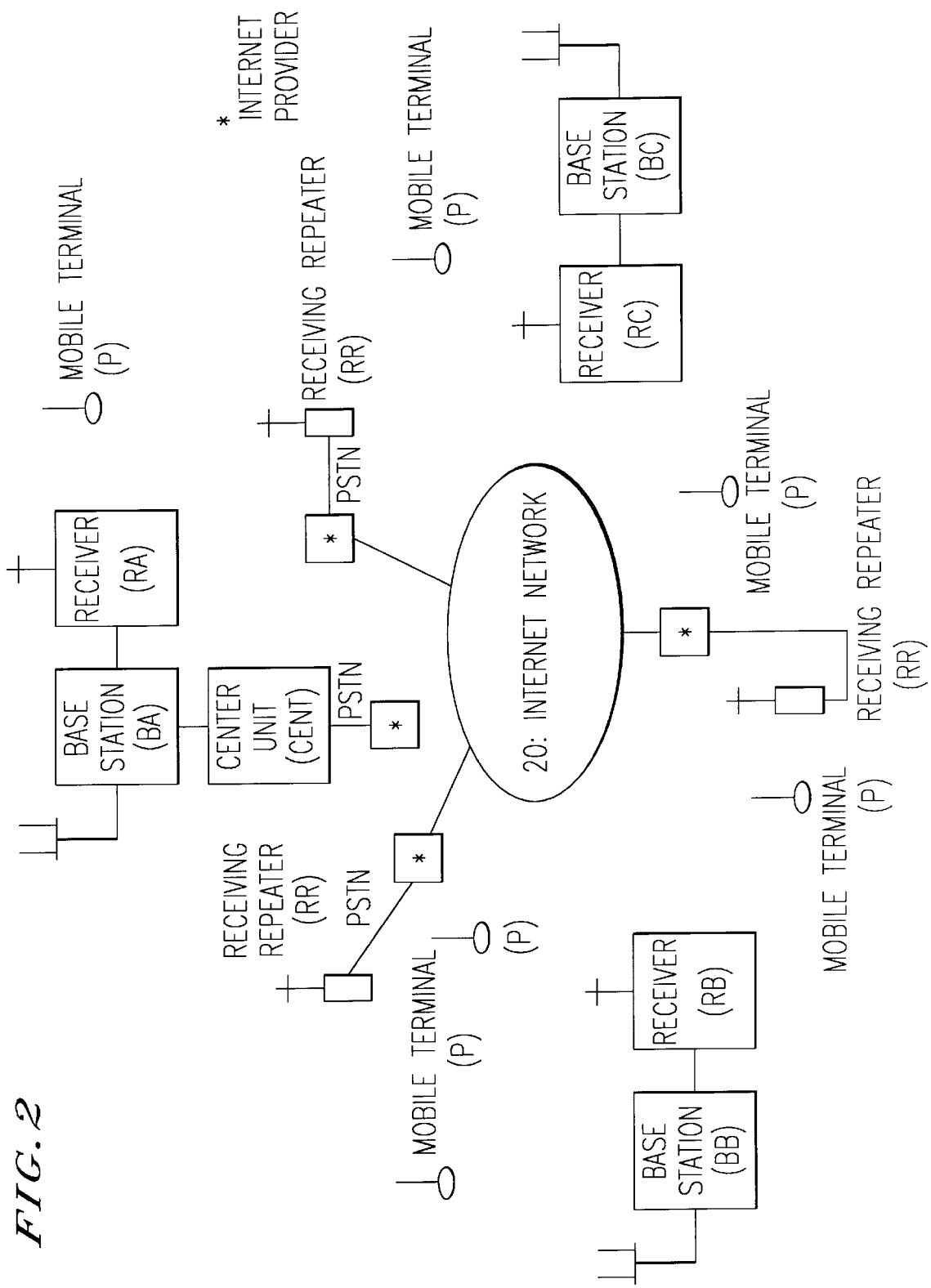
FIG. 2 is a diagram showing the connections between transmitters, receivers and so on in the system shown in FIG. 1.

Referring now to the drawings, where common elements are commonly labeled in the several views, FIG. 1 is a schematic diagram of the configuration of a communication system in accordance with the present invention, and FIG. 2 is a diagram showing connections between base stations, receivers and so on shown in FIG. 1.

Referring to FIG. 1, a central circular region indicated by a thick line is an urban area, and each of circular regions indicated by broken lines and containing the region representing the urban area is called a base station region (base station zone). In this embodiment, three base station zones 2A to 2C are provided and base stations BA to BC are installed in these base station zones 2A to 2C and around the urban area. The base stations BA to BC respectively have receivers RA to RC. The base stations BA to BC have their respective areas to cover in the urban area and are capable of wireless communication in the circular areas (zones) indicated by the broken lines.

The urban area is, for example, a region where there are a number of multistory buildings such that the possibility of occurrence of communication failure such as multipath cancellation or fading is high.

The area extending outside the boundary of the urban area represented by the thick-line circle is a suburban area. One base station zone, e.g., the base station zone 2A overlaps both the urban and suburban areas.

A mobile terminal can move between arbitrary points in the urban and suburban areas, and is capable of communication in its communication area.

Small or medium communication zones are prescribed in the urban and suburban areas. Receiving repeaters RR are placed in the small or medium zones. Each of the receiving repeaters RR performs a relay operation of a signal from a small mobile terminal to one of the base stations if the output level of the mobile terminal is not high enough for direct transmission to the base station. That is, since the output level of a small mobile terminal is low, the receiving repeater receives data transmitted from the small mobile terminal and retransmits the data to the base station through a wire circuit in an Internet network 20, thus enabling transmission from the mobile terminal to a desired transmission destination via the base station. If a mobile terminal has a sufficiently high output level, the mobile terminal can transmit directly to the nearby base station without relaying by the receiving repeater RR.

The configuration of the communication system shown in FIG. 1 and connections between the components of the communication system will be described with reference to FIG. 2.

As mentioned above, the base stations BA, BB, and BC respectively have receivers RA, RB, and RC. Each of the receivers RA, RB, and RC has a receiving antenna. Each of the base stations BA, BB, and BC has a transmitting antenna.

A center unit CENT is provided in the vicinity of the base station BA and is connected, by an Internet provider, to the Internet network 20 formed as a wire communication network via a wire circuit, e.g., a dedicated line, a public system telephone network (PSTN), an integrated services digital network (ISDN) or the like, a PSTN in this embodiment. In FIG. 2, asterisk symbols designate an Internet provider.

In the connections in the communication system illustrated in FIG. 2, the Internet network 20 is wire-connected via the PSTN to the central station CENT connected to the base station BA. The Internet network 20 is also connected to each of the receiving repeaters RR via an Internet provider. Each receiving repeater RR is also connected to the Internet network 20. Accordingly, the receiving repeater RR and the base station BA can be wire-connected to each other via the Internet network 20.

It is not necessary that all the base stations be connected to the Internet network 20. However, at least one of the base stations is wire-connected to the Internet network 20. In this embodiment, the base station BA is wire-connected to the Internet network 20.

All the receiving repeaters are connected to the Internet network 20. This is because each receiving repeater RR receives data by wireless communication and transmits received data to other communication apparatuses via the Internet network 20 while the base stations capable of mutual wireless communication can communicate with each other by transmitting data received from the Internet network 20 if one of the base stations is connected to the Internet network 20.

Figure 3:
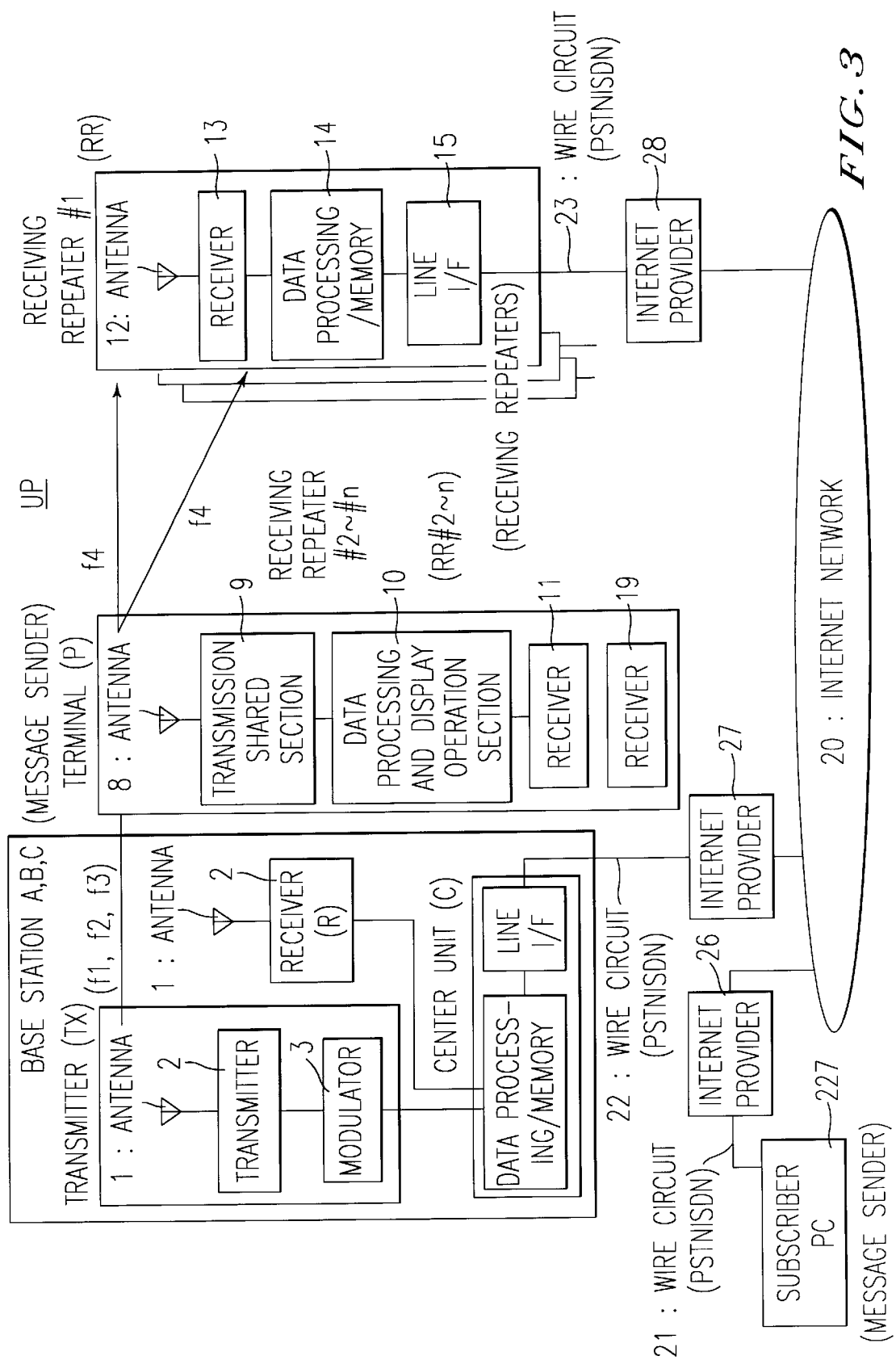
FIG. 3 is a diagram showing the configuration of base stations BA to BC, a receiving repeater RR and a mobile terminal.

FIG. 3 is a diagram showing the configuration of the base stations BA to BC, the receiving repeaters RR and a mobile terminal.

Each of the base station shown in FIG. 3 has a transmitting unit TX having an antenna 1, a transmitting circuit 2 and a modulator 3, and a receiving unit R having a receiving antenna 6 and a receiver 7. The transmitting circuit 2 selectively uses a plurality of channel frequencies, as described below, and therefore includes a circuit for selecting one of the channel frequencies.

Connected to the base station BA is the center unit CENT having a data processor and memory section 4 and a line interface (I/F) 5. In more detail, referring to FIG. 4, the center unit CENT is also connected to the Internet network 20 via the wire circuit 22 and an Internet provider 27 (27A and 27B in FIG. 4).

Thus, no special circuits are required to form each of the base stations BA to BC, and existing circuits can be used for the base stations. As a result, the base stations can be simple in configuration.

In this embodiment, the Internet network 20 is used because it enables simplification of the system configuration because no switchboards (or switch circuits) are used. Any network other than the Internet network 20 may alternatively be used if it is effective in simplifying the system.

A mobile terminal P which can send out a message has an antenna 8, a transmission shared section 9, a data processing and display operation section 10, a receiver 1, and a battery 19 for supplying power to these circuits.

Each receiving repeater RR has an antenna 12, a receiver section 13, a data processor and memory section 14, and a line interface (I/F) 15. Each receiving repeater RR is connected to a wire circuit 23 and to an Internet provider 28 via the line interface 15 to be connected to the Internet network 20. Thus, the receiving repeater is also simple in configuration.

A subscriber's terminal 227 is also connected to the Internet network 20 via a wire circuit 21 and an Internet provider 26. This connection enables data. to be transmitted from the subscriber's terminal 227 to the base station BA via Internet network 20, thereby enabling wireless communication to the other base stations and transmission to mobile terminals.

Figure 4:
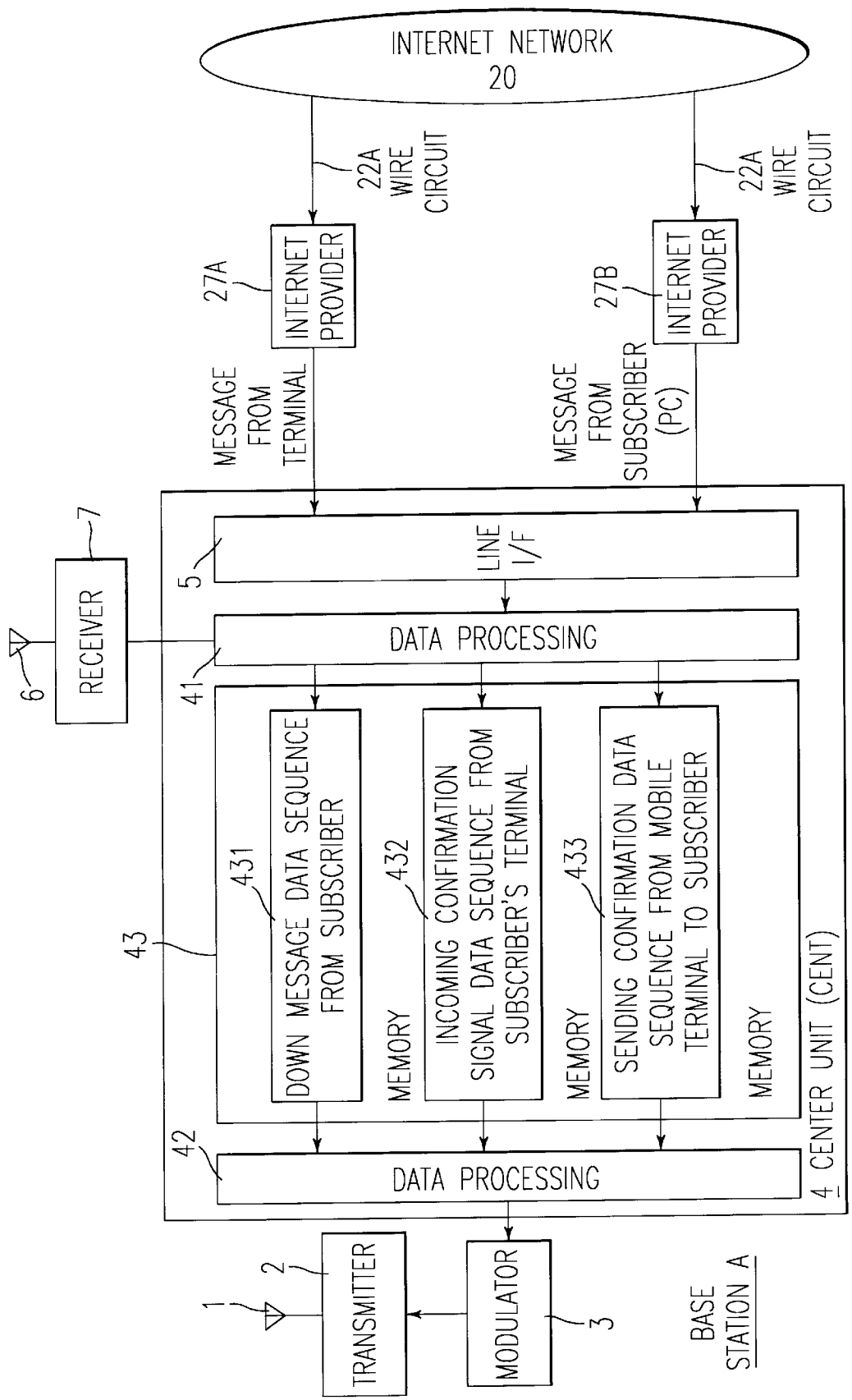
FIG. 4 is a diagram showing the configuration of a center unit.

FIG. 4 is a diagram of the configuration of the center unit CENT shown in FIG. 3.

As mentioned above, the center unit CENT has the data processor and memory section 4 and the line interface (I/F) 5.

The line interface 5 receives, via the Internet network 20, wire circuits 22A and 22B and Internet providers 27A and 27B, message data from the subscriber's terminal 227 and data from the receiving repeater, i.e., message data from the mobile terminal received by the receiving repeater. These received data groups are output to the data processor and memory section 4.

The data processor and memory section 4 has a first data processor 41 and as second data processor 42.

The data processor and memory section 4 has memories placed between the first data processor 41 and the second data processor 42, i.e., a first memory 431 for storing "down message data sequence" from the subscriber's terminal 227, a second memory 432 for storing incoming confirmation data from the subscriber's terminal 227, and a third memory 433 for storing sending confirmation data sent from the mobile terminal P to the subscriber's terminal 227. Each of these memories 431 to 433 is a first-in/first-out (FIFO) type memory such that data input earlier from the first data processor 41 is first output to the second data processor 42. That is, data from the first data processor 41 is temporarily stored as a data sequence in each of these memories before it is output to the second data processor 42.

The first to third memories are shown to be separate from each other as illustrated in FIG. 4. These memories, however, may be combined into one memory unit or may be formed separately and independently as illustrated in FIG. 4.

The first data processor 41 also processes data received from the receiver 7 by the same signal processing as that described above, as well as data received from the line interface 5.

The second data processor 42 processes data from the memory 43, and supplies the processed data to the modulator 3. The data is sent out as "down message" via the transmitting circuit 2 and the antenna 1.

The basic operation of the transmitter TX, the center unit CENT and the receiving repeater RR will be described with reference to FIGS. 1 to 4.

The first data processor 41 at an upstream point of a message data flow is connected to the line interface 5. The line interface 5 receives a message from the mobile terminal and a message from the subscriber's terminal 27. The line interface 5 receives these messages respectively from the first Internet provider 27A connected to the Internet network 20 via the wire circuit 22A and from the second Internet provider 27B connected to Internet network 20 via the wire circuit 22B.

The first data processor 41 processes the message from the terminal and the message from the subscriber's terminal 227 received by the line interface 5 and outputs the processed data to the first to third memories 431 to 433 by referring to the contents of the messages.

The first data processor 41 also receives received data which has been received by the receiving antenna 6 and supplied from the receiver 7, processes the data received by the receiving antenna 6 in the same manner as it processes received data from the Internet network 20, and outputs the processed data to the corresponding one of the first to third memories 431 to 433.

The second data processor 42 processes data sequences output from the first to third memories 431 to 433, and outputs the processed data to the modulator 3 in the transmitter TX. A signal formed by modulation with the data in the modulator 3 is transmitted in the zone shown in FIG. 1 by the transmitting circuit 2 and the antenna 1.

Figure 5:
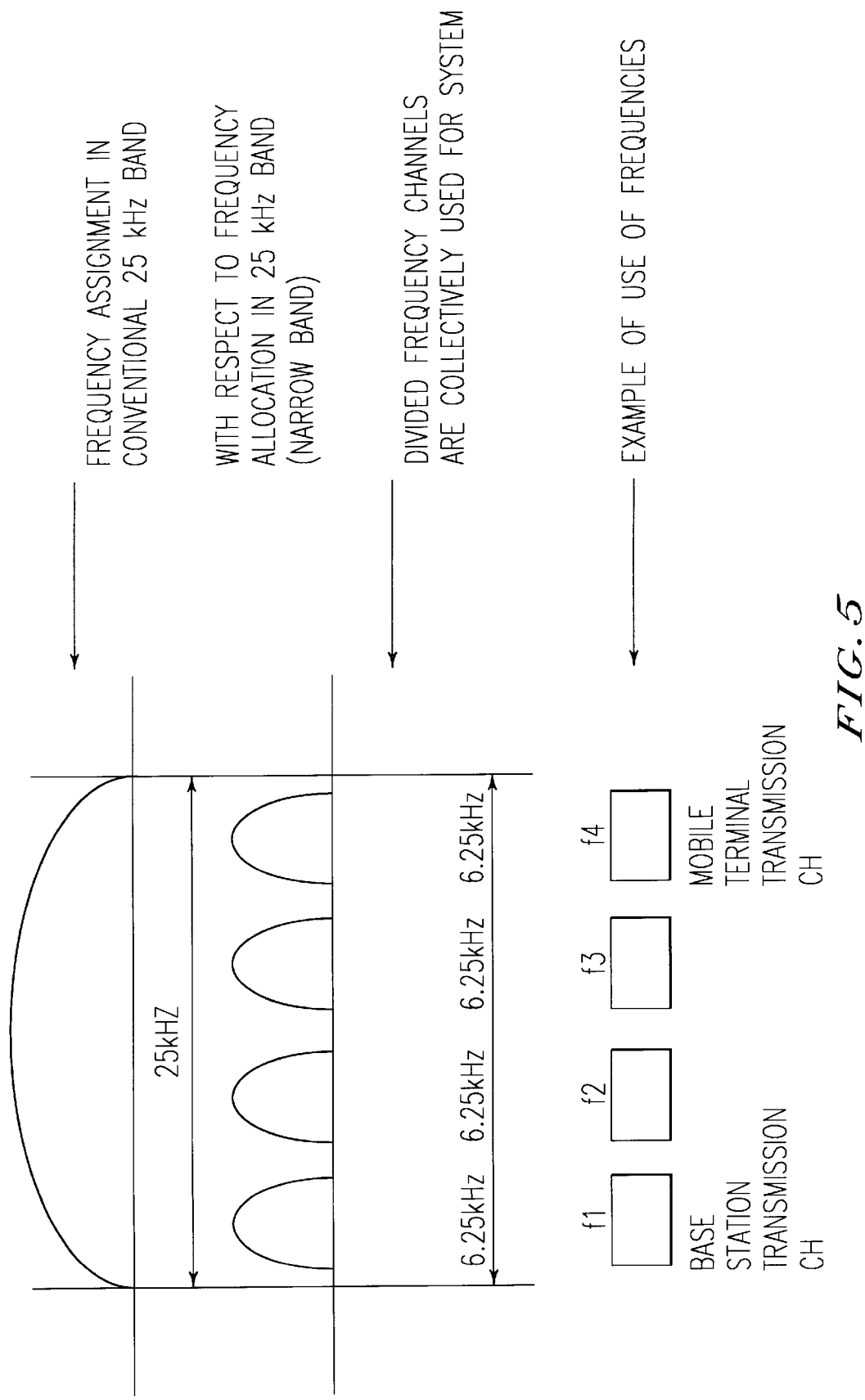
FIG. 5 is a diagram showing a method of using channel frequencies.

FIG. 5 is a diagram showing use of channel frequencies. In the field of the present mobile wireless communication, for channel frequency assignment in VHF and UHF bands, channel widths of 25 kHz, 12.5 kHz and so on are being used. In the United States and other countries, 25 kHz channels are presently used, but there is a movement of band reduction to 12.5 kHz. Methods for reduction to half of 12.5 kHz, i.e., 6.25 kHz, are being studied for application in the near future. With respect to frequency bands other than the 220 MHZ frequency band, no practical use of single channels and no practical communication system or method is known in which narrow channels are set adjacent to each other for systematic use are known.

Frequency allocation in this embodiment is such that the conventional 25 kHz frequency band is divided into four narrower bands. Of these frequency bands, referred to as frequencies f1, f2, f3, and f4 below, the frequency bands f1 to f3 are used for "down data communication" from the base stations to mobile terminals while the frequency band f4 is used for "up data communication" from mobile terminals to the upper base stations. In the description of this embodiment, with respect to data transmitted to the base station BA from the subscriber's terminal 227 via the Internet network 20, transmission of the data from the base station BA to one mobile terminal selected as desired is also referred to as "down data". As described above, the frequency band for one channel is separated into frequencies in four narrower channels by dividing the width of 25.5 kHz by 4, thus achieving effective use of frequencies.

For use of narrower bands, the U.S. Federal Communications Commission has formed a scheme of enabling use of frequencies in 6.25 kHz channels below 512 MHZ in the year of 2005. Similar movements of frequency utilization are also seen in other countries. Thus, the above-described use of frequencies in a narrower band meets the present schemes for communication in future.

Figure 6:
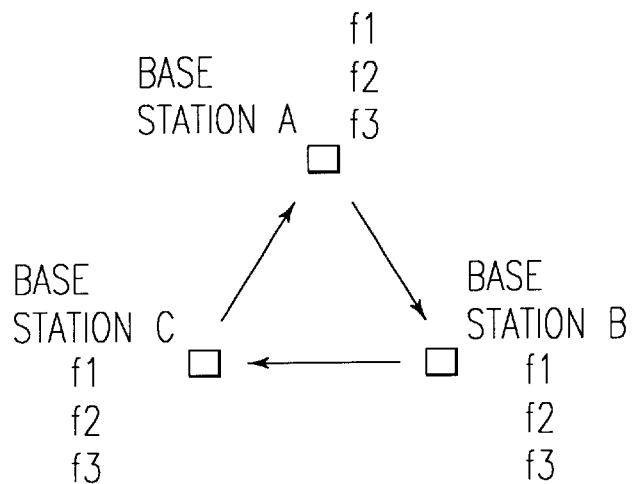
FIG. 6 is a diagram showing the relationship between base stations and channel setting with frequency bands f1 to f3 used for communication between the base stations.

FIG. 6 is a diagram showing the relationship between the base stations and the channel setting with frequency bands f1 to f3 used for communication between the base stations.

While the embodiment has been described with respect to a case where a plurality of base stations are provided. Table 1 shows use of channel frequencies with respect to one base station.

TABLE 1

Example of system (1) [with respect to one base station]

| Base station transmission | Mobile terminal | Up transmission (Answerback) | Receiving repeater |
|---|---|---|---|
| Transmitting on f1 | Mobile terminal of f1 receives | Transmitting on f4 | Receiving f4 and transmitting to base station via wire circuit |
| Transmitting on f2 | Mobile terminal of f2 receives | Same as above | Same as above |
| Transmitting on f3 | Mobile terminal of f3 receives | Same as above | Same as above |
| Repeating these | Group of mobile terminals corresponding to f1 to f3 is adapted or suitable scan-receiving is performed. | If there are many transmissions from terminals, the number of channels is increased. | |

When one base station first performs "down data" transmission by using frequency f1, it transmits the same message data to others on frequency f1. When a mobile terminal capable of operating on frequency f1 receives the transmitted data, it transmits an answer back signal on channel frequency f4. This transmitted answerback signal is received by one of the receiving repeaters to be transmitted as an answerback to the base station via Internet network 20.

When the base station performs a "down messages" transmission for the third time, it transmits data by using the third frequency f3. When a mobile terminal capable of operating on frequency f3 receives the transmitted data, it transmits an answerback signal on channel frequency f4. This transmitted answerback signal is received by one of the receiving repeaters to be transmitted as an answerback to the base station via Internet network 20.

When the base station performs a "down messages transmission for the third time, it transmits data by using the third frequency f3. When a mobile terminal capable of operating on frequency f3 receives the transmitted data, it transmits an answerback signal on channel frequency f4. This transmitted answerback signal is received by one of the receiving repeaters to be transmitted as an answerback to the base station via Internet network 20.

When the base station further performs "down message" transmission, it transmits data by using frequency f1 again. A mobile terminal receiving the data transmits an answerback signal on frequency f4.

This transmitting and receiving operation is repeated.

Table 2 shows a use of channel frequencies with respect to a plurality of base stations provided as described above with reference to the drawings.

TABLE 2

Example of system (2) [with respect to a plurality of base stations]

| Base station A (key station) | Transmitting f1 | Each mobile terminal receives f1 and selects | Transmitting message data and answerback on f4, |
| Base station B | | Receiving f1 retransmitting f1 | errorless message in received data | receiving by receiving repeater, sending to base station via wire circuit |
| Base station C | | Receiving f1, retransmitting f1 | | |

Transmitting and receiving are repeated in the same manner when each of f2 and f3 is used.
Mobile terminal receives on f4, receiving repeater receives transmitted data, and received data is sent to base station via wire circuit.

When base station BA first performs "down data transmission" by using frequency f1, one of the other base stations receiving this data transmits the same message data to the others on the same frequency as frequency f1 on which the data has been received. Each of the base stations receiving the data repeats this transmitting and receiving operation. When a mobile terminal capable of operating on frequency f1 receives the transmitted data, it transmits an answerback signal on channel frequency f4. This transmitted answerback signal is received by one of the receiving repeaters to be transmitted as an answerback to base station BA via Internet network 20.

The base station performing the next "down message" transmission transmits data by using the next frequency f2. One of the other base stations receiving this data transmits the same message data to the others on the same frequency as frequency f2 on which the data has been resolved. This transmitting and receiving operation is repeated, when a mobile terminal capable of operating on frequency f2 receives the transmitted data, it transmits an answerback signal on channel frequency f4. This transmitted answerback is received by one of the receiving repeaters to be transmitted as an answerback to base station BA via Internet network 20.

The base station performing a "down message" transmission for the third time transmits data by using the third frequency f3. One of the other base stations receiving this data transmits the same message data to the others on the same frequency as frequency f3 on which the data has been received. This transmitting and receiving operation is repeated. When a mobile terminal capable of operating on frequency f3 receives the transmitted data, it transmits an answerback signal on channel frequency f4. This transmitted answer back is received by one of the receiving repeaters to be transmitted as an answerback to base station BA via Internet network 20.

The base station further performs the "down message" transmission by transmitting data by using frequency f1 again. One of the other base stations receiving this data transmits the same message data to the others on the same frequency as frequency f1 on which the data has been received.

This transmitting and receiving operation is repeated.

In this embodiment, as described above, the channel frequency is changed with a time shift each time down message transmission is performed. Therefore, even if the communication zones are close to each other and if messages are successively transmitted, communication is free from mutual interference and no jamming occurs.

In this embodiment, data is transmitted by one channel at a time, which is different from a system such as an SMR system using pair channels. Therefore, communication is free from mutual interference, there is no need for a combiner or the like, and circuits simple in configuration may suffice.

Further, in this embodiment, channel frequencies are used with one antenna, so that there is no combination loss and communication can be performed at high efficiency.

In this embodiment, data can be received with substantially no multipath cancellation, fading or the like affecting the data.

In this embodiment, no complicated communication protocols are provided with respect to transmissions between the base stations, and transmissions from the base stations to mobile terminals (to receiving repeaters) and to the base stations. Only a protocol of making each receiving unit respond is used. Since such a simple communication protocol is used, the transmitters and receivers can also be made simpler in circuit configuration.

Figure 7:
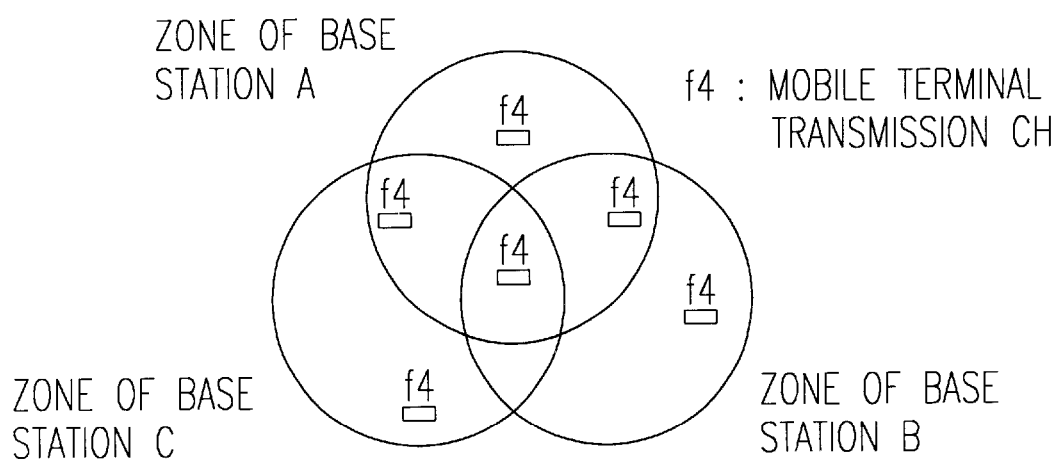
FIG. 7 is a diagram showing the relationship between mobile terminals and channel frequencies.

FIG. 7 is a diagram showing the relationship between mobile terminals and channel frequencies.

Mobile terminals use only up-transmission frequency f4. Ordinarily, the transmission output power of mobile terminals in low. Therefore, even if transmission is performed by using the same frequency f4 over different zones, jamming cannot occur easily between the different zones. If one frequency f4 is used, receiving by each receiving repeater can be easily performed in this embodiment of the present invention, therefore, one frequency f4 is used in common for up message data transmission.

Needless to say, if a sufficiently wide frequency band usable for up message transmission is assigned, or if the amount of communication or the frequency communication is high, a plurality of frequencies for up transmission can be set.

A description will now be given of the operation of the embodiment of the present invention.

The base station BA transmits message data on frequency f1. That is, a signal is formed by modulation with some data in the modulator 3, and the signal carrying the data is transmitted in the air by the transmitting circuit 2 and the antenna 1.

Message data transmitted from the base station BA is received by the receiver RB of the base station BB located near the base station BA. The base station BB forms a signal of the same frequency f1 for the received message by modulation in the modulator 3, and immediately transmits the signal in the air by the transmitting circuit 2 and the antenna 1.

The message data transmitted from the base station BB is received by the receiver RC of the base station BC located near the base station BB. The base station BC immediately transmits the received message on the same frequency. That is, the base station BC forms a signal of the same frequency f1 for the received message by modulation in the modulator 3, and immediately transmits the signal in the air by the transmitting circuit 2 and the antenna 1.

The base station BA monitors the transmitted data from the base station BB and the base station BC to confirm that it can receive the message data sent out by it.

As illustrated in FIG. 1, zones formed as small or medium zones are prescribed in urban and suburban areas, and receiving repeaters are provided in the small or medium zones. One of receiving repeaters RR placed in the small or medium zones receives a transmitted electric wave in the f4 channel sent from a mobile terminal. As illustrated in FIG. 3, a data signal received by the antenna 12 in one of the receiving repeaters RR placed in the small or medium zones is input to the receiver 13 and is demodulated in the receiver 13 to obtain data. Items of the received data are stored in the memory in the data processor and memory section 14 in the same order as the order in which they are input. Simultaneously, the data items are grouped into packets each having a certain data amount and are compressed. The data then undergoes Transmission Control Protocol/Internet Protocol (TCP/IP) header processing, is thereafter sent to the Internet provider 28 in the Internet network 20 via the line interface 15 and the wire circuit 23, and is sent to the center unit CENT via the Internet network 20.

The data received by the center unit CENT is distributed to the first to third memories 431 to 433 with respect to the kinds of the data by the first data processor 41 in the data processor and memory section 4 to be stored in the memories 431 to 433. The first data processor 41 performs processing for decomposing the packets, error correction and checking, processing for eliminating redundant data, etc., and successively stores, in the memories 431 to 433, data to be sent as an answerback for confirmation of incoming to the message sender, i.e., mobile terminal P in this example, and data to be sent to the subscriber's terminal or another mobile terminal P to form queues.

As illustrated in FIG. 3, message data from the subscriber's terminal 227 to the mobile terminal P is transmitted from the Internet provider 26 via the wire circuit 21 connecting the subscriber's terminal 227 and the Internet network 20, is sent to the Internet network 20 via the Internet provider 26, and is set to the center unit CENT via the Internet provider 27 and the wire circuit 22. Such message data is stored in the corresponding one of the memories 431 to 433 in the data processor and memory section 4 of the center unit CENT, is maintained in a wait state in a down message queue, and is successively sent as down data to the mobile terminal P via the transmitter TX by a method described below.

When a down message is sent from the subscriber's terminal 27 to the mobile terminal P, several incoming confirmation messages from mobile terminal P may be sent by being combined and added to the down message.

These message data groups are repeatedly transmitted by the base stations BA to BC, as described above.

Reliable message communication can be achieved by repeatedly sending the same message data from a plurality of base stations in the above-described manner. Consequently, uniform communication with reduced bit errors can be achieved in any urban zone, even zones that are crowded with buildings and suburban zones where buildings are scattered.

Such repeated transmissions of the same message data has a diversity effect (attributable to signal redundancy) such that a communication system can be established in which occurrence of bit errors is limited, and which has improved reliability.

In the above-described embodiment, an Internet system is incorporated as a wire circuit, so that existing communication and data processing systems and communication apparatus can be used. As a result, the entire system can be constructed at a comparatively low cost and can be easily operated.

In the above-described embodiment, frequencies f1 to f3 in four channel frequencies f1 to f4 in 6.25 kHz narrow bands obtained by dividing a 25.5 kHz band are used for down data transmission, while frequency f4 is used for up data transmission. However, use of these channels is set as desired according to conditions. For example, frequencies f1 and f2 may be for down data transmission while frequencies f3 and f4 are used for up data transmission.

Further, a frequency band wider than 25.5 kHz may be used by being divided into a larger number of 6.25 kHz narrow bands.

The width of narrow bands used in accordance with the present invention is not limited to 6.25 kHz.

In the above-described example of band setting, the width of the narrow band is set to 6.25 kHz because the main theme relates to transmission of message data.

If the communication system and the communication method of the present invention are used for other applications, they may be changed and modified in various ways from their forms as presented in the embodiment described above.

While the embodiment of the present invention has been described with respect to a preferred arrangement with reference to the drawings, and while the configuration and operation of the system, including Internet network 20, receiving repeaters and subscriber's terminal 227, with which the invention will be carried out, have been described, it is not always necessary to prepare such apparatuses connected by wire circuits. Conversely, any other apparatus may be added to the illustrated apparatus arrangement. Such modifications may be easily made by those skilled in the art.

According to the present invention, reliable message transmission can be achieved by a simple method. That is, the same data is repeatedly transmitted by changing the channel frequency with a time shift each time a down message transmission is performed. Therefore, even if the communication zones are close to each other and if messages are successively transmitted, communication is free from mutual interference and no jamming occurs. As a result, a diversity effect can be achieved and a stable and reliable communication system with reduced bit errors can be established with respect to any urban zone, even zones crowded with buildings, and suburban zones where buildings are scattered.

According to the present invention, frequencies can be effectively utilized.

According to the present invention, data is transmitted by one channel at a time, so that communication is free from mutual interference, there is no need for a combiner or the like, and circuits simple in configuration may suffice.

Further, according to the present invention, channel frequencies are used with one antenna, so that there is no combination loss and communication can be performed at high efficiency.

According to the present invention, a wire communication system such as an Internet network is incorporated to enable use of existing communication and data processing systems and communication apparatuses. As a result, the entire system can be constructed at a comparatively low cost and can be easily operated.

In this embodiment, no complicated communication protocols are provided with respect to transmission between the base stations, and transmission from the base stations, to mobile terminals (to receiving repeaters) and to the base stations. Only a protocol of making each receiving unit respond is used. Since such a simple communication protocol is used, the transmitters and receivers can also be made more simple in circuit configuration.

The mechanisms and processes set forth in the present description may be implemented using a general purpose microprocessor programmed according to the teachings in the present specification, as will be appreciated to those skilled in the relevant art(s). Appropriate software coating can readily be prepared by skilled programmers based on the teachings of the present disclosure, as will be apparent to those skilled in the relevant art(s).

The present document is based on Japanese Patent Application Hei 9-318123, filed in the Japanese Patent Office on Nov. 19, 1997, the entire contents of which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system having a first area where communication with a mobile terminal can be performed and a second area where communication can be performed with the mobile terminal when on a periphery of the first area, said system comprising:

a plurality of base stations provided on the periphery of the first area, each of said base stations being configured to communicate via wireless communication in the first area, down message data being transmitted on a first frequency in a first narrow band of a channel frequency from an originating base station of said plurality of base stations, each of the other plurality of base stations configured to receive the down message data and then transmit the down message data on the first frequency; and a mobile terminal configured to receive the down message data transmitted from the originating base station and other base stations and configured to transmit up message data to the plurality of base stations by using a second frequency in a second narrow band of the channel frequency different from the first frequency used for transmission of the down message data.

2. A communication system according to claim 1, further comprising:

a wire communication network to which at least one of said plurality of base stations is wire-connected; and receiving and repeating means being wire-connected to said wire communication network and for receiving in another communication area where reception by one of the plurality of base stations is marginal or not possible a signal transmitted from the mobile terminal, and relaying the signal via said wire communication network to the at least one of the plurality of base stations connected to said wire communication network, wherein said receiving and repeating means is for receiving the signal as the up message data transmitted from the mobile terminal and sending the up message data to the base station via said wire communication network.

3. A communication system according to claim 2, wherein:

the originating base station is configured to monitor a state of transmission of the down message data between the other base stations and is configured to transmit a next message data on a third frequency in a third narrow band of a channel frequency, where the third frequency being different from the first frequency and the second frequency;

each of the other base stations configured to receive the next message data and send out the next message data on the third frequency; and the mobile terminal being configured to receive the next message data transmitted from the originating base station and other base stations and transmit the up message data to the plurality of base stations by using the second frequency in the second narrow band of the channel frequency.

4. A communication system according to claim 2, further comprising:

a subscriber's terminal being wire-connected to said wire communication network, wherein, subscriber message data from said subscriber's terminal being transmitted as the down message data via said wire communication network from the at least one of the plurality of base stations connected to said wire-communication network.

5. A communication system according to claim 1, wherein each of said first and second narrow bands have a frequency bandwidth of 6.25 kHz.

6. A communication system according to claim 2, wherein each of said first and second narrow bands have a frequency bandwidth of 6.25 kHz.

7. A communication system according to claim 3, wherein each of said first, second and third narrow bands have a frequency bandwidth of 6.25 kHz.

8. A communication system according to claim 4, wherein each of said first and second narrow bands have a frequency bandwidth of 6.25 kHz.

9. A communication system according to claim 2, wherein said wire communication network includes an Internet communication network.

10. A communication system according to claim 3, wherein said wire communication network includes an Internet communication network.

11. A communication system according to claim 4, wherein said wire communication network includes an Internet communication network.

12. A communication system according to claim 6, wherein said wire communication network includes an Internet communication network.

13. A communication system according to claim 7, wherein said wire communication network includes an Internet communication network.

14. A communication system according to claim 8, wherein said wire communication network includes an Internet communication network.

15. A communication method using a first area where communication with a mobile terminal can be performed, and using a second area where communication can be performed with the mobile terminal when on a periphery of the first area, and a plurality of base stations positioned on the periphery of the first area, each of said base stations being configured to communicate with each other via wireless communications in the first area, said method comprising the steps of:

transmitting down message data on a first frequency in a first narrow band of a channel frequency from an originating base station of the plurality of base stations;

sending out, from each of the other base stations that receive the down message data from the originating base station, the down message data on the first frequency; and transmitting, from the mobile terminal after receiving the down message data transmitted from at least one of the originating base station and the other base stations, up message data to the plurality of base stations by using a second frequency in second narrow band of the channel frequency, said second frequency being different from the first frequency.

16. A communication method according to claim 15, wherein at least one of the plurality of base stations is wire-connected to a wire communication network, and further comprising the steps of:

receiving the up message data from the mobile terminal at a receiving and repeating mechanism that is wire-connected to said wire communication network; and relaying the up message data via said wire communication network to the at least one of the plurality of base stations connected to the wire communication network.

* * * * *